Sept. 15, 1959     J. J. DICKSON     2,904,487
CONTROL DEVICE
Filed Nov. 17, 1954     2 Sheets-Sheet 2
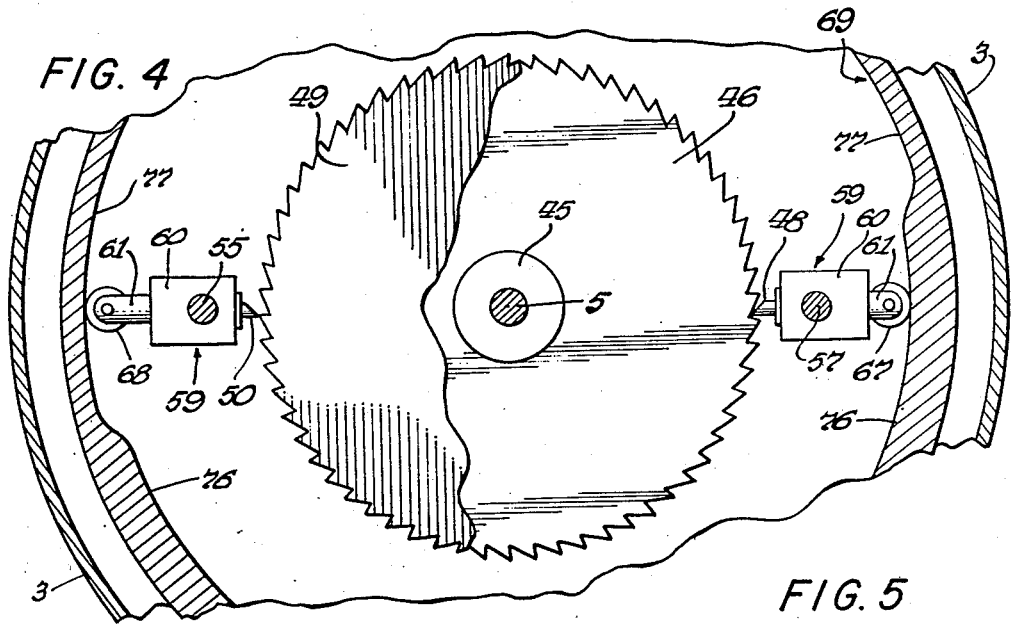
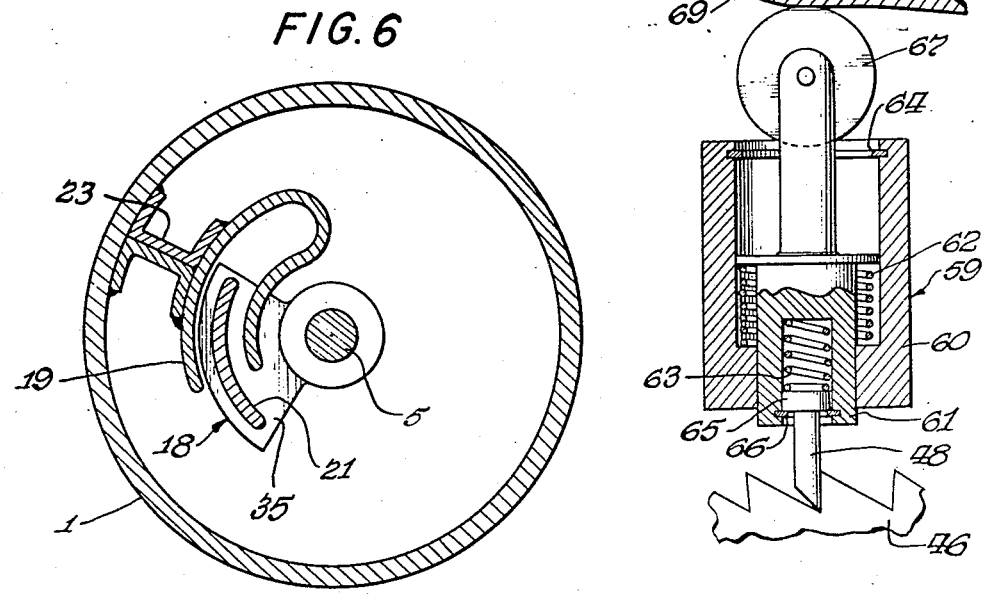
INVENTOR.
JAMES J. DICKSON
BY
ATTORNEY 2,904,487
Patented Sept. 15, 1959

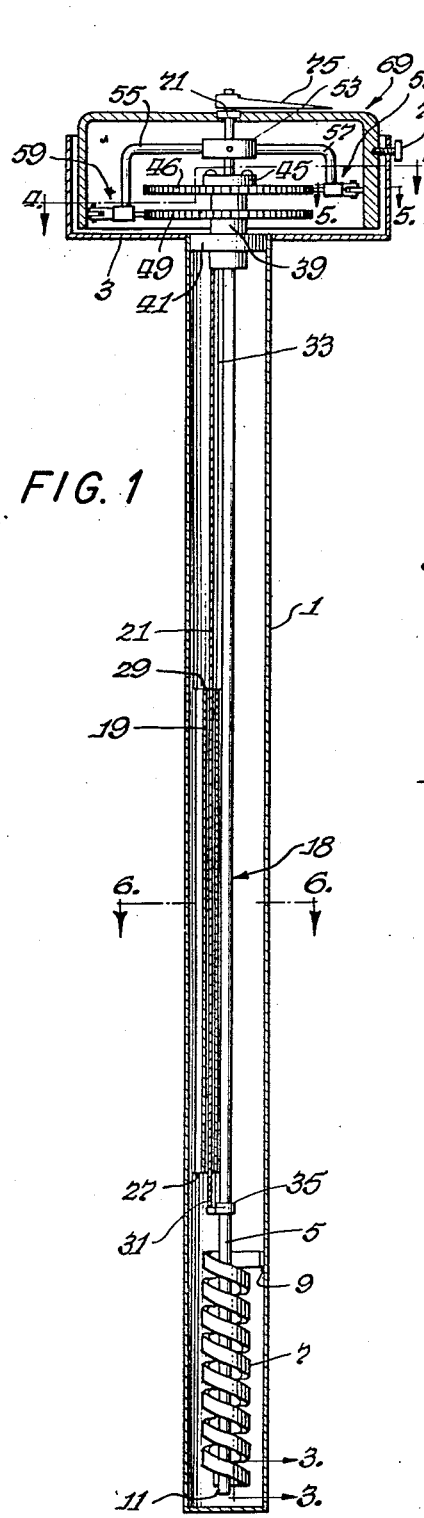

2,904,487
CONTROL DEVICE

James J. Dickson, Brookfield, Ill., assignor to the United States of America as represented by the United States Atomic Energy Commission Application November 17, 1954, Serial No. 469,566

4 Claims. (Cl. 204—193.2)

This invention relates to neutronic reactors and more particularly to the control thereof.

Control of a thermal-neutron reactor is effected by variation in the rate of neutron absorption within the interior of the reactor core. Reactors and the control thereof are disclosed and claimed in Fermi et al. Patent 2,708,656, dated May 17, 1955. Various materials having a high thermal-neutron-absorption cross section, of which cadmium is an example, are such efficient neutron absorbers that a substantial portion of the neutron flux impinging upon the absorbing material is extinguished in the surface zones of the neutron-absorbing material. Under these circumstances the quantity of thermal neutrons absorbed in a given unit of time is, to a first order approximation, a function of the surface area of the absorbing material exposed to the neutron current. Consequently, it is found to be practical to vary the thermal-neutron flux within a neutronic reactor by varying the area of neutron absorbing material exposed to the neutron current. The exposed area may be varied by moving the neutron-absorbing materials with respect to one another within the region of dense neutron flux so that one member may shield or "shadow" another member from the full neutron intensity. By appropriate increase and decrease of the exposed surface areas of the neutron-absorbing materials or "control rods," the rate of neutron absorption may be varied, and in turn, the rate of reactivity in the reactor, controlled. The present invention discloses a device readily adapted to vary the surface area of a neutron-absorbing material during exposure to a neutron flux.

A radiation shield about the core is necessary to the safe operation of a neutronic reactor. Consequently, an advantage is attainable in the form of simplified shielding in reactor design if the reactor-control mechanism can be imbedded within the reactor core making it possible to dispense with bulky and complex mechanical assemblies exterior to the reactor core, required to position the control rods. The device of the present invention readily lends itself to mounting within the reactor core and does not at any time require the withdrawal of the control members from the region of high neutron-flux density; it need not protrude beyond the reactor structure and does not add to the complexity of the required radiation shielding.

In the past neutron reactor control members have customarily been positioned within the reactor by means energized from power sources exterior to the reactor itself. Such means have included electrical, hydraulic, and mechanical devices. In the event the external source of power fails or is interrupted, control of the reactor is impeded or entirely suspended, with the result that there is a safety hazard to personnel and the installation, or at a minimum, costly delays during reactivation of the reactor following an abrupt shutdown occasioned by "fail safe" features of the reactor controls. The device of the present invention includes means for utilizing the variation of neutron flux within the reactor itself for powering the apparatus. With this novel arrangement, the consequences of external-power-source failures are avoided.

An automatic neutronic-reactor control must include a sensitive element for detecting variation in some measurable parameter of the reactor reactivity and a transducer element that translates a signal from the sensing element into an appropriate repositioning of the control members. The device of the present invention includes within one simple structure the sensitive element, the transducer, and a mechanical power-generating device directly responsive to the first index of reactivity, namely, neutron flux. The simplicity of the combined sensing element and mechanical drive of the present invention attains advantages of greater dependability, ruggedness, and simplicity of design.

The invention broadly comprises neutron-absorbing members in which the total thermal-neutron-absorption rate may be varied by small movements of the absorbing members with respect to one another, in combination with a transducer means capable of generating mechanical movement in response to changes in neutron flux impinging thereon.

The transducer comprises a bimetallic element utilizing metallic uranium in such a manner that a temperature gradient is generated in the bimetal in response to neutron flux change in the region of the bimetal.

Uranium$^{235}$ exposed to thermal-neutron radiation responds by prompt and intense local heating due to the fission of uranium atoms. For a quantitative discussion of the energy released in the fission process see Glasstone and Edlund, "The Elements of Nuclear Reactor Theory," New York, 1952, page 69 and following. When a small mass of metallic uranium$^{235}$ is included in a quantity of metallic material formed into an elongated strip and the strip is exposed to a thermal neutron flux, the uranium fissions at a rate proportional to the flux, releasing heat in the strip, and causing the strip to expand according to the coefficient of thermal expansion of the strip.

The bimetallic element may be fabricated from two metallic strips each of which has substantially the same coefficient of thermal expansion and one of which contains material that is readily fissionable upon exposure to thermal neutrons such as uranium$^{235}$. When the bimetallic element is shaped to form a helical coil and the whole is irradiated with thermal neutrons, the bimetal will respond by asymmetrical thermal expansion, and thereby induce a rotational movement of one end of the helical coil with respect to the other end.

The movement induced in the helical coil is readily transmitted by suitable means to the neutron-absorbing members, causing these members to move in a manner calculated to alter the total neutron-absorbing efficiency of these members taken as a whole.

Further advantages of the present invention will become apparent from the following drawings, and specification, wherein a preferred embodiment of the invention is described in detail.

In the figures:

Fig. 1 is a longitudinal sectional view of the novel device of the present invention;

Fig. 2 is an enlarged detail, on the same plane as is shown in Fig. 1, of a part of the upper portion of the device;

Fig. 3 is a sectional view taken on the line 3—3 of Fig. 1 and showing a bimetal element forming an important part of the present device;

Fig. 4 is a horizontal sectional view, with parts removed, taken on the line 4—4 of Fig. 1 showing a cam, pawls, and ratchets;

Fig. 5 is a horizontal sectional view taken on the line 5—5 of Fig. 1 and showing one of the pawls and a cam follower associated therewith; and Fig. 6 shows a transverse section of the control rods along line 6—6 shown in Fig. 1.

Referring to Fig. 1, an elongated thin-walled cylindrical thimble 1, closed at the lower end, and made of some material having a low neutron-absorption cross section, such as aluminum is shown in a longitudinal cross sectional view. The upper end of the thimble 1 opens into a short cylindrical circular drum 3 and is rigidly attached to a central opening in the base of the drum. The drum 3 is larger in diameter than the thimble. The thimble and drum taken together form a shroud casing as well as a mounting base for the entire device of the present invention. A rod 5 is positioned along the cylindrical axis of the thimble, extending from close to the lower end thereof upward through the thimble 1, through the drum 3, and terminating a distance above the drum 3. The rod may rotate about its axis and is held in place by bearings which will be described below.

A helical bimetal coil 7 is positioned in the lower end of the thimble 1 coaxial with the rod 5. As shown in Fig. 1, the upper end of the coil 7 is attached to the interior of the thimble 1 at 9, and the lower end of the coil is attached to the lower end of the rod 5 at 11. As shown in Fig. 3, the bimetal coil 7 consists of a strip 13 of uranium and zirconium and a strip 15 of metallic zirconium bonded thereto and having a coefficient of thermal expansion approximately the same as that of the strip 13. The strip 13 is formed of an alloy containing 96% wt. Zr and 4% wt. $U^{235}$-enriched uranium such as uranium containing 93.4% $U^{235}$ and a balance of $U^{234}$ and $U^{238}$. The strips 13 and 15 are shallow channels that are bonded to one another only along their respective edges and are elsewhere spaced from one another, so that the bimetal 7 is a hollow structure.

As shown in Figs. 1 and 6, a neutron-absorbing control means 18 is positioned within the thimble 1 a short distance above the coil 7. In the form shown in these figures, the control means 18 comprises a stationary control member or envelope 19 and a movable control member 21, which are shown in longitudinal section in Fig. 1 and in transverse section in Fig. 6. The envelope 19 is attached to the interior of the thimble 1 by a bracket 23, which is shown in Fig. 6 to comprise two channel members placed back to back and bonded to the thimble and to the envelope. The envelope 19 is a hollow elongated member formed of segments of circular cylinders of different radii spaced from one another at the edges at one side and joined to one another at the edges at the other side, the axes of the segments being coincident with the axis of the thimble. Thus the envelope is open at the one side so as to be capable of receiving the movable member 21, which is a solid plate curved to conform generally to a segment of a circular cylinder having its axis coincident with the axis of the thimble 1. Further, the control member 18 is of such curvature and dimensions that it readily fits into the envelope 19. As shown in Fig. 1, the envelope 19 extends for an appreciable portion of the length of the thimble 1 and has a lower end 27 a short distance above the coil 7 and an upper end 29 well spaced from the top of the thimble. The movable member 21 has a lower end 31 between the lower end 27 of the envelope 19 and the upper end of the bimetal 7 and an upper end 33 a short distance below the upper end of the thimble 1. The envelope 19 is open at its lower end 27 and at its upper end 29.

The movable member 21 is held in its proper position in the envelope 19 by means of a bracket 35 which is attached to the lower end of the control member 21 at 31 and is mounted on the rod 5 so as to be free to rotate independently thereof. A hollow shaft 39, extending from the interior of the drum 3 downward concentrically into the thimble 1, is attached to the upper end 33 of the movable member and serves to transmit appropriate angular motion to the control member 21.

The shaft 39 is rotatably mounted in a bearing 41 positioned in the top of the thimble 1 at the junction between the drum 3 and the thimble 1. Referring to Fig. 2, the rod 5 passes through the hollow interior of the shaft 39 and beyond its upper end. A collar 43 rigidly attached to the rod 5 is held between a recessed retaining cap 45 and a ratchet wheel 46 to which the cap 45 is secured by screws 47, in such a way that the rod 5 is positioned concentrically within the hollow interior of the shaft 39 free to rotate about its longitudinal axis with respect thereto but restrained from axial movement with respect thereto.

As shown in Figs. 2 and 4, ratchet wheel 46 and a ratchet wheel 49 are attached concentrically to the shaft 39, the wheel 46 being above the wheel 49 and at the top of the shaft 39. Ratchet wheel 46 has teeth inclined in a counterclockwise direction when viewed from above as in Fig. 4 and thus will be moved clockwise when a pawl 48 engages the ratchet wheel 46 and moves clockwise, but will not be moved counterclockwise by the pawl 48. The ratchet wheel 49 has clockwise inclined teeth when viewed from above as in Fig. 4 and thus will be moved counterclockwise when a pawl 50 engages it and moves counterclockwise, but will not be moved clockwise by clockwise movement of the pawl 50. A bracket 53 is rigidly attached to the rod 5 at a region above the retaining cap 45. Two arms 55 and 57, secured to the bracket 53, extend radially in opposite directions therefrom and terminate in downwardly directed ends adjacent the peripheries of the ratchet wheels 49 and 46, respectively. As shown in Fig. 1, the left-hand arm 55 has a slightly longer outer end than the right-hand arm 57; this difference in length is necessitated by the short vertical distance separating the two ratchet wheels 46 and 49.

Fig. 5 shows in cross section a support 59 by which the pawl 48 is carried on the arm 57. The support 59 comprises an outer member or housing 60, an inner member or piston 61, and coil springs 62 and 63. The outer member 60 is secured to the downwardly directed end on the arm 57 and slidably mounts the inner member 61. The spring 62 acts against the members 60 and 61 to urge the inner member 61 in a direction that appears upward in Fig. 5 but is actually radially outward when considered with respect to the shafts 5 and 39, or in other words, away from the ratchet wheel 46. A retaining ring 64 in the outer member 60 prevents the inner member 61 from being forced out of the outer member 60. The spring 63 acts against the inner member 61 and an enlarged head 65 on the pawl 48 to urge the pawl toward the ratchet wheel 46. The pawl 48 is slidably mounted in the inner member 61 by means of the pawl head 65. A retaining ring 66 in the inner member 61 keeps the pawl 48 in the inner member 61. The inner member carries on the end opposite the pawl 48 a rotatable follower 67 which engages an internal cup-shaped cam 69. By another similar support 59 the pawl 50 is carried on the arm 55. The inner member 61 of this support carries a rotatable follower 68 which is spring-urged outwardly against an internal dome-like cam 69. The cam 69 is mounted in the drum 3 for rotation about an axis coincident with those of the shafts 5 and 39. The cam 69 may be held against rotation with respect to the drum 3 by means of a thumb screw 73 which is threaded through the drum 3 so as to be engageable with the cam 69. A bearing 71 between the cam 69 and the upper end of the shaft 5 rotatably mounts the shaft in the drum and helps to maintain the axis of the shaft in a fixed position. An indicator arm 75 is rigidly attached to the shaft 5 above the cam 69.

The embodiment of the invention specified in detail above is readily adapted to control a neutronic reactor by insertion of the thimble 1 into a conventional neutronic reactor control rod tube, not shown in the drawings. The reader is referred to the copending application of common assignee, S.N. 429,712, of Howard C.

Ellsworth, filed May 7, 1954, for disclosure of a neutronic reactor control rod tube. The thimble 1 may be placed in a control rod tube and extended into the core of the reactor, leaving only the drum 3 protruding beyond the reactor radiation shield. When the thimble 1 is so positioned, the bimetallic coil 7 and the stationary neutron absorbing member 19 will be within the active core of the neutronic reactor and therefore within a region of intense neutron flux during periods of operation of the reactor.

The core temperature of a neutronic reactor will be higher than ambient during any period of reactor operation. When the thimble 1 is positioned in the heated core, the uranium-zirconium strip 13 and the zirconium strip 15 in the bimetallic coil 7 will be heated by thermal conduction of heat through the thimble 1. As these metallic strips 13 and 15 heat, they are subject to thermal expansion, and accordingly, as illustrated in Fig. 1, the lower end 11 of the bimetal coil 7 will when viewed from above rotate clockwise with respect to the end 9 of the bimetal helix 7 which is rigidly attached to the interior wall of the thimble 1, because of the tendency of the coil 7 to unwind. Rotational motion of the lower end of the coil is transferred through the rod 5 upward to the bracket 53 and to the arms 55 and 57. Movement of the arms causes the supports 59 to rotate about the interior of the cam 69. Referring now to Fig. 4 continued clockwise movement of the supports 59 bring the parts to the position of Fig. 4, in which the follower 67 engages a high portion 76 of the cam 69, and the follower 68, a low portion 77 of the cam. The high cam portion 76 has an interior surface that has a smaller radial distance from the axis of the shaft 5 than has the interior surface on the low cam portion 77. Engagement of the follower 67 with the high cam portion 76 causes the pawl 48 to move into engagement with the ratchet wheel 46, with the result that continued clockwise movement of the shaft 5 and support 57 produced clockwise movement of the ratchet wheel 46 and the parts fixed to it, namely, the shaft 39 and the movable control member 21. Thus increasingly larger portions of the member 21 retreat into the hollow cavity within the envelope 19.

In addition to the rotational movement induced in the helical coil 7 by heat generated within the reactor core, a further rotational movement is induced in the coil 7 in response to the neutron flux present within the reactor core during normal operation of the reactor. When the thimble 1 is positioned in the reactor core and the reactor is operating at a normal level of reactivity, neutrons penetrate the thimble 1 and strike the uranium-zirconium strip 13 in the coil 7. A substantial part of these uranium atoms upon being struck by neutrons fission and thereupon release heat. The rate of heating from fission in the strip 13 is directly proportionate to the neutron flux density about the coil 7.

It is manifest that if the uranium-zirconium strip 13 is on the outer side of the coil 7 and if it is heated by fission therein to a temperature higher than that in the zirconium strip 15, the lower end 11 of the coil 7 will be rotated so as to tend to wind up the coil, in response to the differential thermal expansion induced in the two strips 13 and 15. This rotation of the coil 7, which is counterclockwise when viewed from above, will be transmitted through the rod 5, the brackets 53, the arms 55 and 57, and the supports 59 to the cam followers 67 and 68 and the pawls 48 and 50. The cam follower 68, associated with the counterclockwise ratchet wheel 49, will upon sufficient counterclockwise movement respond to engagement of the high cam portion 76 by causing the associated pawl 50 to move and engage the counterclockwise ratchet wheel 49. The resulting counterclockwise movement of the ratchet wheel 49 will rotate the hollow shaft 39 and the control member 21 counterclockwise, resulting in exposure of an increasingly larger proportion of the control member 21 to the neutron flux outside the hollow cavity of the envelope 19.

The final position of the control member 21 when the thimble 1 is in a neutronic reactor operating at a given level of reactivity will be determined by the algebraic sum of the rotational movement induced in the coil 7 by the heat and by the neutron flux within the reactor core, and the relative angular position of the cam high portion 76 with respect to the envelope 19. A "zero position" of the control member 21 appropriate to any given reactor core temperature and neutron flux density may be selected by appropriate rotation of the cam 69 on the bearing 71. The cam 69 is normally held fixed with respect to the drum 3 and all parts rigidly connected therewith including the envelope 19. However, when the thumb screw 73 is released the cam 69 is readily rotated on the bearing 71; and if the thumb screw 73 is tightened against the cam 69 subsequent to its adjustment, the cam will then be held fixed in any given new angular position. When the cam 69 is rotated sufficiently far by the above procedure one of the ratchet wheels 46 or 49, depending upon the direction of rotation, will be engaged by the associated pawl 48 or 50, and rotated with the cam subsequent to the pawl engagement. Rotation of one of the ratchet wheels 48, 50 will cause rotation of the shaft 39 and thereby bring about repositioning of the control member 21 with respect to the envelope 19.

Preparatory to instituting the automatic control of a neutronic reactor by means of the present invention, the thimble portion 1 of the device, containing the uranium bimetal coil 7, the stationary neutron absorbing member 19, the movable neutron absorbing member 21, and associated mechanical linkages is inserted into the core of the reactor; manual access to the drum 3, thumb screw 73, and cam 69 is retained by leaving these portions of the device outside the reactor radiation shield. The bimetal coil 7 quickly assumes the temperature of the reactor core and the metallic uranium-zirconium strip 13 is heated to a temperature proportionate to the neutron flux density present. The bimetallic coil 7 rotates accordingly in response to these two sources of heating; the rotation in the coil 7 is transmitted through the mechanical linkages 5, 53, 55, 57, 59, 48, 50, 49, 46, 69, 39 described above to the movable control member 21. For the condition of constant neutron flux density in the reactor core and after the bimetallic coil 7 attains the reactor core operating temperature the movable control member 21 assumes a steady position with respect to the envelope 19. Thereupon the movable control member 21 may, by means of rotating the cam 69 on the bearing 71, be rotated to a "zero control position" with respect to the envelope 19. The "zero control position" is typically one where a portion of the control member 21 is shielded or "shadowed" from the main neutron current in the reactor core by the envelope 19, the remaining portion of the control member 21 being exposed to the unattenuated neutron flux. Simultaneously the neutronic reactor is adjusted by the appropriate positioning of shim rods in the reactor core to operate at a substantially constant rate of reactivity. The reader is referred to the aforesaid Ellsworth application, S. N. 429,712, for disclosure of conventional neutronic reactor shim rods.

After the movable control member 21 has been placed in the appropriate "zero control position" for the given temperature and neutron flux of the neutronic reactor, any increase in neutron flux within the reactor core will heat the uranium-zirconium strip 13 within the bimetal coil 7 causing the coil end 11 to rotate with respect to the end 9. The rotational movement is transferred along the rod 5, bracket 53, arm 55, and support 59 causing the cam follower 67 and pawl 48, associated with the counterclockwise ratchet wheel 46, to engage and rotate the ratchet wheel 51, the shaft 39, and finally the movable control member 21 which then is rotated counterclockwise with respect to the envelope 19. Such movement in the control member 21 exposes an increasing portion of its surface area outside the envelope 19 to the neutron flux in the reactor core; therewith an increased absorption of neutrons by the control member 21 decreases the rate of reactivity within the reactor core. Thus any trend toward increased reactivity within the reactor core is checked and even reversed by the apparatus.

Any decrease in reactivity within the reactor core will result in proportionate cooling of the uranium-zirconium strip 13 within the coil 7. Under normal operating conditions the uranium-zirconium strip 13 is heated by the energy of fission within the strip 13 to a temperature many degrees above that of the zirconium strip 15. Any decrease in neutron flux density about the bimetal coil will result in a decreased fission rate in the uranium-zirconium strip 13, therefore in decreased heat generation and a lowering of the temperature of the uranium-zirconium strip 13 in the coil 7. Accordingly, the coil end 11 will be rotated clockwise with respect to the coil end 9. The rotational movement will be transferred along rod 5 to the bracket 53, the arm 57 and the support 60. After sufficient clockwise rotation the cam follower 68 will engage the high portion 76 of the cam 69 and force the pawl 48 associated with the clockwise ratchet wheel 46 to engage and rotate the ratchet wheel 46, the shaft 39 and finally, the movable control member 21, which then is rotated clockwise with respect to the envelope 19. Such movement in the control member 21 exposes a decreasing proportion of the surface area outside the envelope 19 to the neutron flux in the reactor core, thereby causing a decreased absorption of neutrons by the control members. A decreased rate of absorption of neutrons in the reactor core favors increasing reactivity within the reactor core. Thus any trend toward decreased reactivity within the reactor core below a preselected operating level is automatically checked and even reversed by the apparatus. It will be noted that the mechanical linkage between the neutron sensitive coil 7 and the movable control member 21 is a lost motion linkage. The control member 21 is not adjusted to the total instantaneous increase or decrease in neutron flux but is adjusted in response to increase or decrease in neutron flux beyond a previously selected "zero position." The advantage of such a lost motion linkage lies in the fact that the time law in the response of the apparatus damps out small periodic perturbations in the neutron flux and reduces the likelihood that the apparatus would oscillate harmonically about the desired operating position.

From the above specification it is evident that a neutronic reactor may be automatically controlled to operate at any practical preselected level of reactivity and temperature by utilizing the embodiment of the present invention disclosed herein. One skilled in the art will readily find further and different practical embodiments of this invention; accordingly it is intended that the invention be limited not by the specifications of the apparatus herein disclosed but only by the following claims.

What is claimed is:

1. A self-powered device for the automatic control of a nuclear reactor comprising a stationary hollow curved control member open along one edge and being made of a neutron absorbing material, a movable curved control member made of a neutron absorbing material in the form of a plate and being mounted to rotate into and out of the stationary control member, a bimetal helix consisting of a strip containing enriched uranium and a metal strip bonded thereto and having a coefficient of thermal expansion substantially equivalent to that of the uranium-containing strip, and means for translating the rotary motions of the bimetal helix to the movable control member whereby the bimetal helix expands and rotates in response to changes in neutron flux causing the movable control member to move into and out of the stationary control member exposing less and more neutron absorbing material, respectively, to the neutron flux.

2. The device of claim 1 wherein the means for rotating the movable control member comprises a rod positioned on the axis of the bimetal helix, firmly attached at one extremity to one end of the helix, and extending through the helix and beyond its other end; a generally circular cylindrical thimble made of a material having a low neutron absorption cross section positioned to encase the helix, the control members, and the rod; a bracket attached to the end of the rod remote from the end to which the helix is attached; a pair of arms extending radially oppositely from the bracket; two pawls mounted on the arms and positioned to point toward the rod; two cam followers mounted on the arms and being connected with the pawls so as to control the same; an internal dome-like cam rotatably mounted on the rod beyond the bracket, extending over the arms and the bracket, and engaging the cam followers; adjustable means for securing the cam rigidly to the thimble; a clockwise ratchet wheel and a counterclockwise ratchet wheel secured rigidly to the movable control member and being concentric with the rod; the stationary control member being rigidly attached to the interior of the thimble; and the thimble being attached to the end of the helix remote from the end to which the rod is attached; whereby the movable control member may be adjusted with respect to the stationary control member independently of the helix when the cam is not secured to the thimble, and the helix is used to control the position of the movable control member with respect to the stationary control member when the cam is secured to the thimble.

3. A control device for a nuclear reactor comprising an open hollow stationary control member and a movable control member shaped to fit within the hollow of the stationary member and positioned to move into and out of the hollow by an arcuate motion, both members containing a material of high neutron-absorption cross section, a neutron-flux-responsive helix consisting of a strip containing enriched uranium and a metal strip bonded thereto and having a coefficient of thermal expansion substantially equivalent to that of the uranium-containing strip, and means by which rotary motion of the helix may be transmitted to the movable control member, whereby changes in neutron flux in the vicinity of the helix causes changes in the temperature of the helix inducing twisting in the helix which through the means causes the movable control member to rotate to increase the amount of the movable control member within the stationary control member in response to decreased neutron flux and to rotate to decrease the amount of the movable control member within the stationary control member in response to increased neutron flux.

4. The device of claim 3 wherein the means for transmitting rotary motion of the helix to the movable control member comprises a rod attached at one extremity to one end of the bimetal helix and extending along the axis of the helix through the helix and beyond the opposite end thereof, a bracket fastened to the extremity of the rod remote from the extremity to which the helix is attached, a pair of arms extending radially oppositely from the bracket, two pawls mounted on the arms so as to point toward the rod, two cam followers mounted on the arms and being connected with the pawls so as to control the same, an internal cam mounted concentrically about the rod and engaging the followers, a clockwise ratchet wheel and a counterclockwise ratchet wheel both mounted concentrically about the rod and rigidly attached to the movable control member and being engaged by the pawls, means for adjustably connecting the cam to the end of the helix remote from the end to which the rod is connected, whereby when the cam is disconnected from the helix the relative positions of the movable control member and the stationary control member may be arbitrarily adjusted to permit an initial setting of the movable control member with respect to the stationary control member appropriate to the ambient temperaure about the helix, and when the cam is thereupon connected to the helix, twisting of the helix induced by changes in neutron flux is transmitted through the rod, bracket, arms, pawls, and ratchet wheels to the movable control member, which moves with respect to the stationary control member.

References Cited in the file of this patent

UNITED STATES PATENTS

| | | |
|---|---|---|
| 1,676,923 | Phelan et al. | July 10, 1928 |
| 2,284,082 | Block | May 26, 1942 |
| 2,479,034 | Bolesky | Aug. 16, 1949 |